(12) United States Patent
Adams et al.

(10) Patent No.: US 8,090,963 B2
(45) Date of Patent: Jan. 3, 2012

(54) AUTOMATED POWER MANAGEMENT OF A PERIPHERAL DEVICE

(75) Inventors: Neil Patrick Adams, Waterloo (CA); Herbert A. Little, Waterloo (CA); Michael McCallum, Elmira (CA)

(73) Assignee: Research In Motion Limited, Waterloo (CA)

( * ) Notice: Subject to any disclaimer, the term of this patent is extended or adjusted under 35 U.S.C. 154(b) by 840 days.

(21) Appl. No.: 12/033,284

(22) Filed: Feb. 19, 2008

(65) Prior Publication Data

US 2009/0210729 A1 Aug. 20, 2009

(51) Int. Cl.
*G06F 9/30* (2006.01)

(52) U.S. Cl. ........ 713/300; 713/310; 713/320; 713/321; 713/322; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| | | | |
|---|---|---|---|
| 4,449,248 A | 5/1984 | Leslie et al. | |
| 5,361,397 A | 11/1994 | Wright | |
| 5,519,506 A | 5/1996 | D'Avello et al. | |
| 5,539,925 A | 7/1996 | Yli-Kotila et al. | |
| 5,625,882 A | 4/1997 | Vook et al. | |
| 5,870,680 A | 2/1999 | Guerlin et al. | |
| 5,924,017 A | 7/1999 | Pinter et al. | |
| 6,044,359 A | 3/2000 | Goodwin, III | |
| 6,571,111 B1 | 5/2003 | Mayo et al. | |
| 6,851,068 B2 | 2/2005 | Jochiong et al. | |
| 7,051,218 B1 | 5/2006 | Gulick et al. | |
| 2002/0095611 A1 | 7/2002 | Jochiong et al. | |
| 2005/0050195 A1 | 3/2005 | Chen et al. | |
| 2005/0085279 A1* | 4/2005 | Aoki | 455/574 |
| 2006/0019645 A1 | 1/2006 | Azimi et al. | |
| 2007/0260851 A1* | 11/2007 | Taha et al. | 712/204 |

FOREIGN PATENT DOCUMENTS

EP 1501324 A1 1/2005

OTHER PUBLICATIONS

Roeder, J., TD242LP Power Down and Wake Up Sequence Application Note, Apr. 2004, pp. 1-8, Rev. 1.0, TransDimension Inc., Irvine, California, USA.
Extended European Search Report dated Sep. 30, 2008 issued in connection with Corresponding European Patent Application No. 08151639.5.

* cited by examiner

*Primary Examiner* — M Elamin (74) *Attorney, Agent, or Firm* — Ridout & Maybee LLP (57) ABSTRACT

Based on bounds of a period of reduced operation for a base device, a base device generates a power management message for transmission to a peripheral device. In the power management message, the base device inserts bounds of a period of reduced operation for the peripheral device. As a result, the periods of reduced operation conserve battery power in both devices and the two devices may reestablish a communications channel upon reaching the end of the period of reduced operation and resuming normal operations.

19 Claims, 7 Drawing Sheets

AUTOMATED POWER MANAGEMENT OF A PERIPHERAL DEVICE

FIELD OF THE INVENTION

The present application relates generally to control of a device peripheral to a base device and, more specifically, to automated power management of the peripheral device by the base device.

BACKGROUND OF THE INVENTION

Mobile telephones, personal digital assistants (PDAs) and mobile, handheld computers are typically small, portable devices and have limited battery life. In some cases, the devices are powered off when not in use, for example, overnight while the user sleeps. If left in an on state while the user sleeps, the charge on the battery for the device will drain due to continuous operation. Some devices may be programmed to automatically shut off, i.e., reduce operations to a minimal few, including a timer, at a predetermined time each day and automatically resume full operation at another predetermined time, thereby conserving battery charge, for example, while the user sleeps.

The operation of mobile communication devices may be enhanced with peripheral input and/or output devices. Such peripheral devices may be connected directly to the mobile device by a wire or, as is increasingly prevalent, the mobile device and the peripheral device may communicate over a wireless channel, such as may be provided through the use of the Bluetooth™ communication protocol.

BRIEF DESCRIPTION OF THE DRAWINGS

Reference will now be made to the drawings, which show by way of example, embodiments of the present disclosure, and in which.

DETAILED DESCRIPTION OF THE EMBODIMENTS

In the case wherein a mobile device is maintaining an ongoing connection to a peripheral device and, according to a predetermined schedule, shuts itself off, several problems may arise. As a consequence of shutting off, the connection between the mobile device and the peripheral device ends. The peripheral device may not have an interface sophisticated enough to allow for scheduled shut down and turn on times and, therefore, the peripheral device is expected to stay in the on state after the mobile device has shut off. While the peripheral device may be preprogrammed to shut itself off if the peripheral device is not involved in a connection for a predetermined period of time, it may be considered that any time that the peripheral device is on while the mobile device is off is a waste of charge on the battery of the peripheral device. Furthermore, when the mobile device turns itself on at the predetermined time, the connection to the peripheral device, and, consequently, the enhanced operation provided by the peripheral device, is unavailable. Additionally, if the peripheral device is configured to maintain a degree of privacy, time-sensitive keys may be involved in the formation and maintenance of a secure connection between the mobile device and the peripheral device. Such time-sensitive keys may expire while the connection between the mobile device and the peripheral device is inactive during the time that the devices are powered off.

It would be advantageous to arrange for rapid reestablishment of the connection when a link, which has been previously severed, is restored.

Based on bounds of a period of reduced operation for a base device, a base device generates a power management message for transmission to a peripheral device. In the power management message, the base device inserts bounds of a period of reduced operation for the peripheral device. As a result, the periods of reduced operation conserve battery power in both devices and the two devices may rapidly reestablish a communications channel upon reaching the end of the period of reduced operation and resuming normal operations.

According to one aspect of the application, there is provided, at a base device, a method of managing power of a peripheral device. The method includes receiving an indication of bounds of a period of reduced operation for the base device, generating a power management message, the power management message including an indication of bounds of a period of reduced operation for the peripheral device and transmitting the power management message to the peripheral device. Additionally, a base device is provided for carrying out this method and a computer readable medium is provided for containing instructions to allow a processor in a base device to carry out this method.

According to another aspect of the application, there is provided a method of managing power at a peripheral device. The method includes receiving, from a base device, a power management message, the power management message including an indication of bounds of a period of reduced operation for the peripheral device and, according to the indication, reducing operations of the peripheral device at a first time and resuming operations of the peripheral device at a second time. Additionally, a peripheral device is provided for carrying out this method.

According to a further aspect of the application, there is provided a system including a base device and a peripheral device. The base device includes a processor adapted to receive an indication of bounds of a period of reduced operation for the base device and generate a power management message, the power management message including an indication of bounds of a period of reduced operation for the peripheral device. The base device also includes a transmitter for transmitting the power management message to the peripheral device. The peripheral device includes a processor adapted to receive, from the base device, the power management message and, according to the indication, reduce operations of the peripheral device at a first time and resume operations of the peripheral device at a second time.

Other aspects and features of the present application will become apparent to those of ordinary skill in the art upon review of the following description of specific embodiments of the application in conjunction with the accompanying figures.

Figure 1:
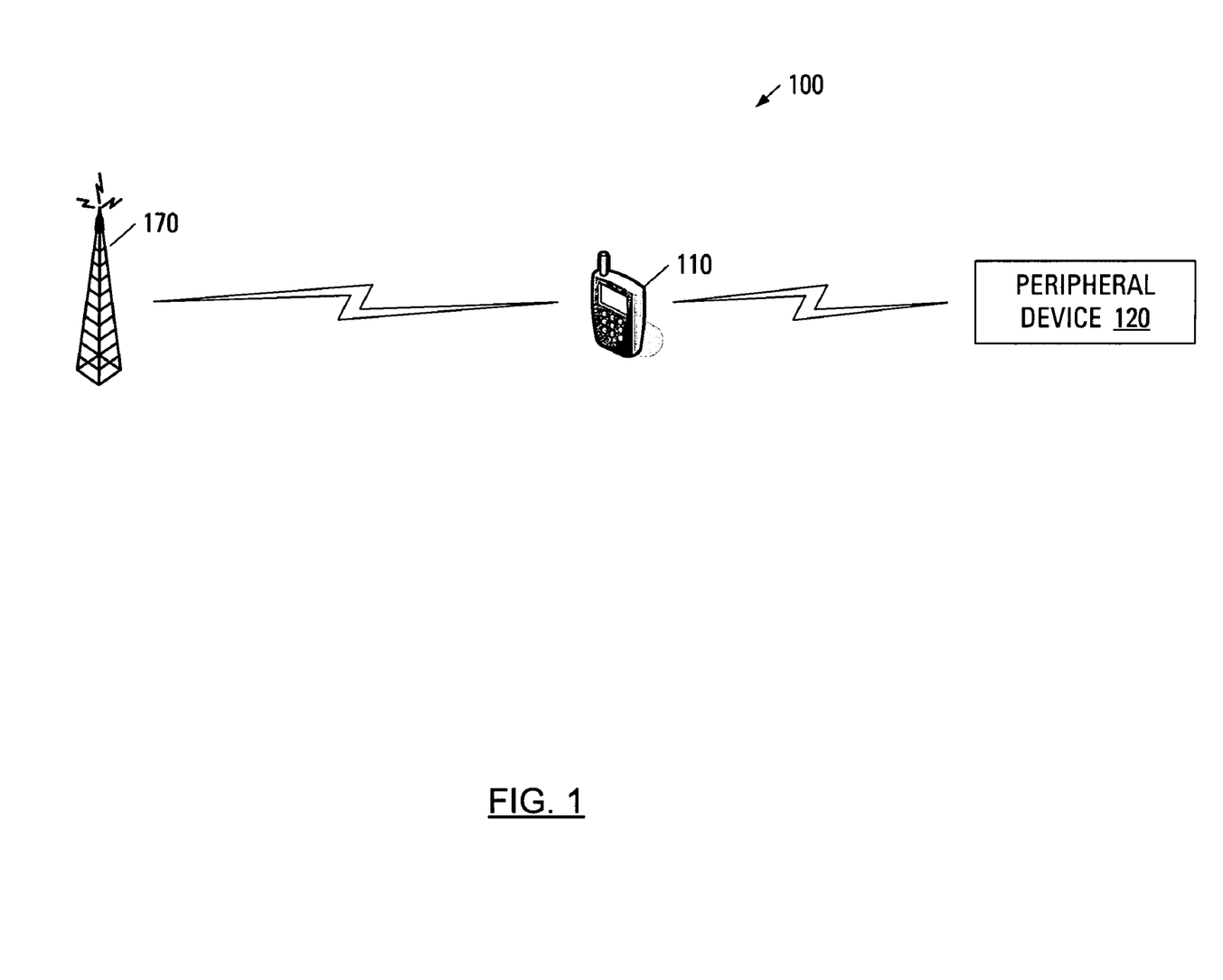
FIG. 1 illustrates an environment for operation of a base device in conjunction with a peripheral device.

FIG. 1 illustrates an environment 100 for operation of a base device. In this example, the base device comprises a handheld mobile communication device referred to herein as mobile device 110. In other embodiments, the base device may comprise a personal computer, such as a desktop computer, a notebook computer or an automobile-based computer console. The mobile device 110 is arranged to communicate with a wireless communication network 170 (represented by a radio tower) for voice and data communication with other communication devices, service providers, etc. The mobile device 110 is arranged for wireless communication with a peripheral device 120. Generally, the term "peripheral device" is used to refer to a hardware component that is connected to a computer to perform input, output or other specialized functions. Example peripheral devices include a monitor, a keyboard, a printer, a disk, a tape, a graphics tablet, a scanner, a smart card reader, a joy stick, a paddle, a mouse, a speaker, a headphone, a microphone, a modem, a switch, a voice synthesizer and an internal memory card.

Figure 2:
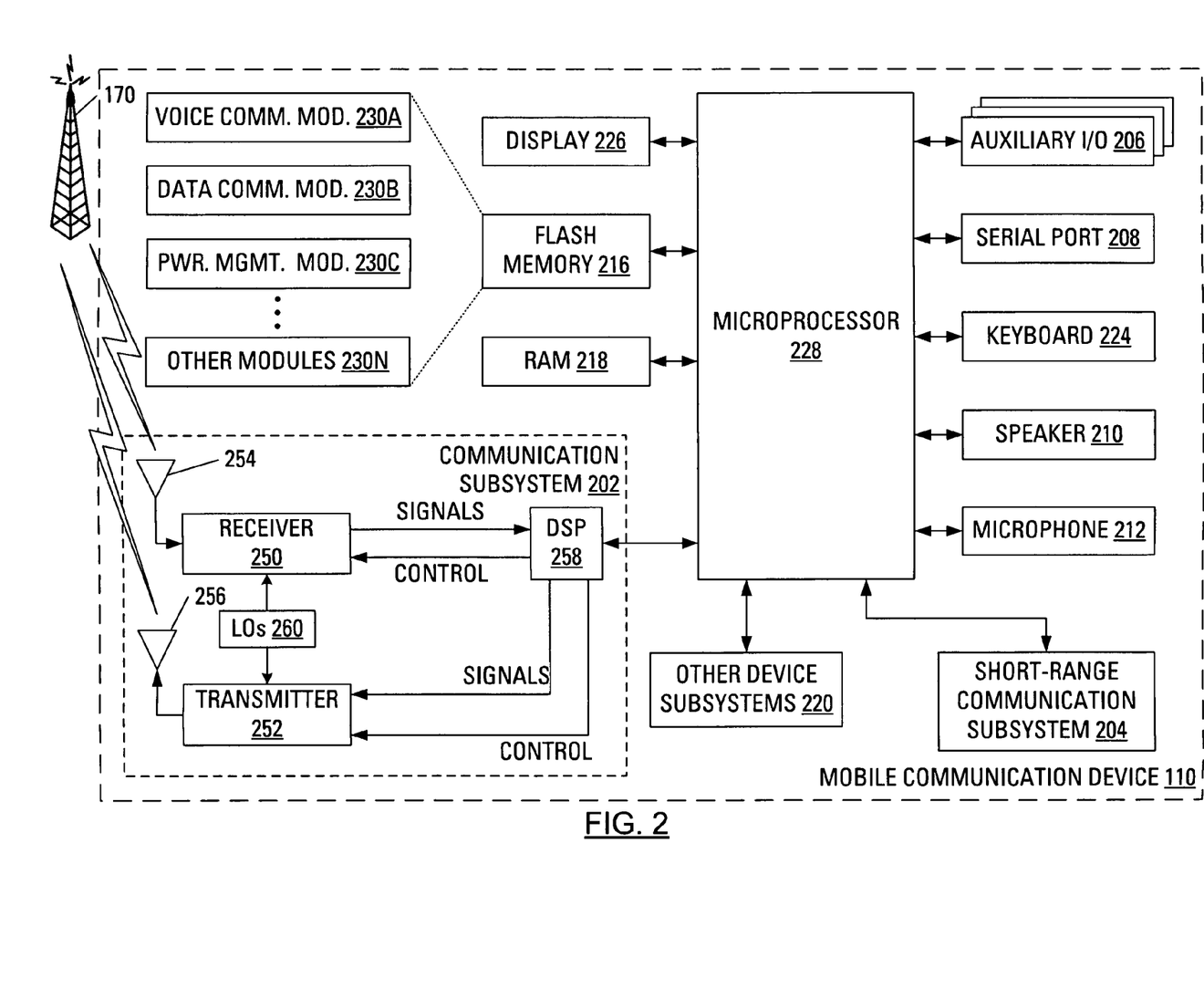
FIG. 2 schematically illustrates detail of the base device of FIG. 1.

FIG. 2 illustrates the mobile device 110 in accordance with various embodiments of the present disclosure. The mobile device 110 may comprise a housing, an input device (e.g., a keyboard 224 having a plurality of keys) and an output device (e.g., a display 226), which may be a full graphic, or full color, Liquid Crystal Display (LCD). Other types of output devices may alternatively be utilized. In some embodiments, the display 226 may comprise a touchscreen display. In such embodiments, the keyboard 224 may comprise a virtual keyboard. A processing device (a microprocessor 228) is shown schematically in FIG. 2 as coupled between the keyboard 224 and the display 226. The microprocessor 228 controls the operation of the display 226, as well as the overall operation of the mobile device 110, in part, responsive to actuation of the keys on the keyboard 224 by a user.

The housing may be elongated vertically, or may take on other sizes and shapes (including clamshell housing structures). Where the keyboard 224 includes keys that are associated with at least one alphabetic character and at least one numeric character, the keyboard 224 may include a mode selection key, or other hardware or software, for switching between alphabetic entry and numeric entry.

In addition to the microprocessor 228, other parts of the mobile device 110 are shown schematically in FIG. 2. These include: a communications subsystem 202; a short-range communications subsystem 204; the keyboard 224 and the display 226. The mobile device 110 may further include other input/output devices, such as a set of auxiliary I/O devices 206, a serial port 208, a speaker 210 and a microphone 212. The mobile device 110 may further include memory devices including a flash memory 216 and a Random Access Memory (RAM) 218 and various other device subsystems 220. The mobile device 110 may comprise a two-way radio frequency (RF) communication device having voice and data communication capabilities. In addition, the mobile device 110 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile device 110. A predetermined set of software applications that control basic device operations, such as a voice communications module 230A and a data communications module 230B, may be installed on the mobile device 110 during manufacture. A power management module 230C may also be installed on the mobile device 110 during manufacture, to implement aspects of the present disclosure. As well, additional software modules, illustrated as other software modules 230N, which may comprise, for instance, a personal information manager (PIM) application, may be installed during manufacture. The PIM application may be capable of organizing and managing data items, such as e-mail messages, calendar events, voice mail messages, appointments and task items. The PIM application may also be capable of sending and receiving data items via the wireless carrier network 170 represented by a radio tower. The data items managed by the PIM application may be seamlessly integrated, synchronized and updated via the wireless carrier network 170 with the device user's corresponding data items stored or associated with a host computer system.

Communication functions, including data and voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the mobile device 110 is intended to operate. For example, the communication subsystem 202 of the mobile device 110 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile device 110.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network.

Despite identifying a subscriber by SIM, mobile devices within GSM/GPRS networks are uniquely identified using an International Mobile Equipment Identity (IMEI) number.

When network registration or activation procedures have been completed, the mobile device 110 may send and receive communication signals over the wireless carrier network 170. Signals received from the wireless carrier network 170 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 170 are processed (e.g., modulated and encoded) by the DSP 258 and are then provided to the transmitter 252 for digital to analog conversion, frequency up conversion, filtering, amplification and transmission to the wireless carrier network 170 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the microprocessor 228. The received signal is then further processed by the microprocessor 228 for output to the display 226, or alternatively to some auxiliary I/O devices 206. A device user may also compose data items, such as e-mail messages, using the keyboard 224 and/or some other auxiliary I/O device 206, such as a touchpad, a rocker switch, a thumb-wheel, a trackball, a touchscreen, or some other type of input device. The composed data items may then be transmitted over the wireless carrier network 170 via the communication subsystem 202.

In a voice communication mode, overall operation of the device is substantially similar to the data communication mode, except that received signals are output to a speaker 210, and signals for transmission are generated by a microphone 212. Alternative voice or audio I/O subsystems, such as a voice message recording subsystem, may also be implemented on the device 110. In addition, the display 226 may also be utilized in voice communication mode, for example, to display the identity of a calling party, the duration of a voice call, or other voice call related information.

The short-range communications subsystem 204 enables communication between the mobile device 110 and other proximate systems or devices, which need not necessarily be similar devices, such as the peripheral device 120. For example, the short-range communications subsystem may include an infrared device and associated circuits and components, or a Bluetooth™ communication module to provide for communication with similarly-enabled systems and devices.

Figure 3:
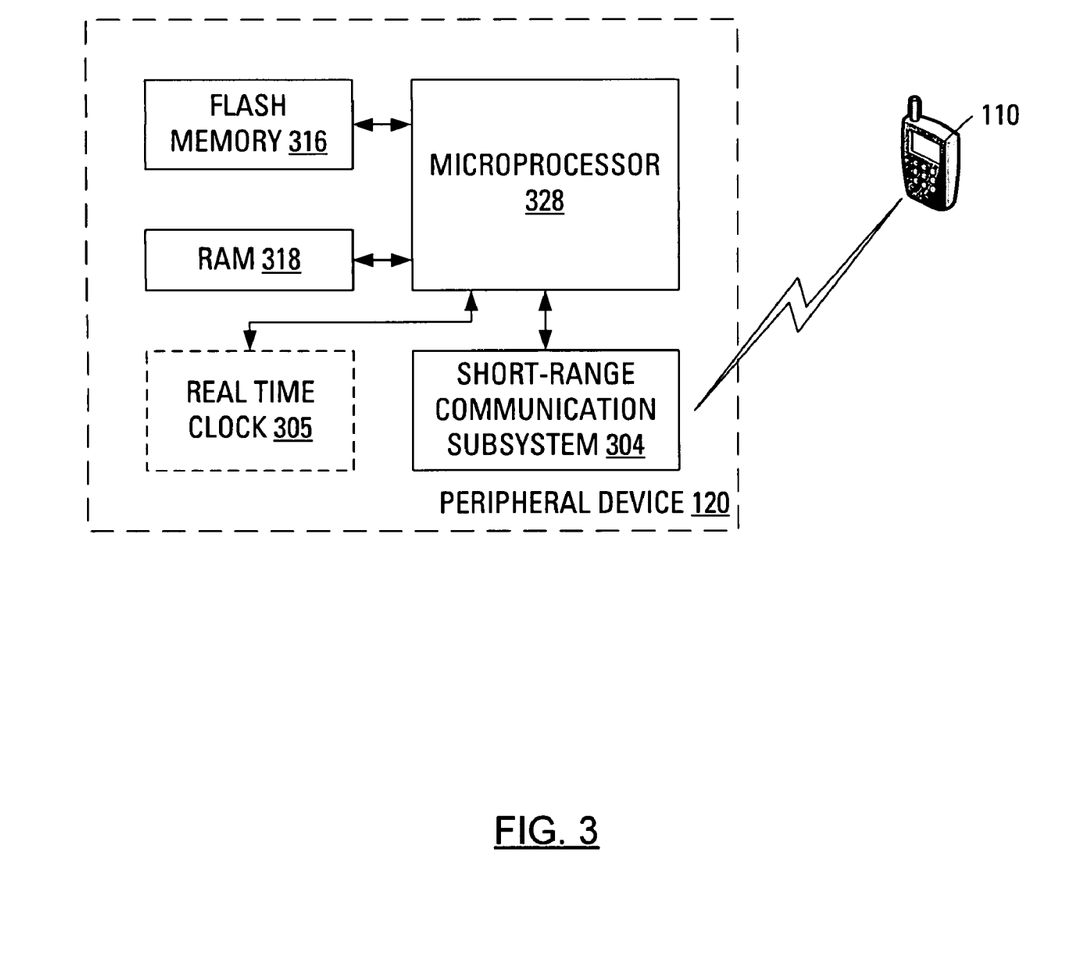
FIG. 3 schematically illustrates detail of the peripheral device of FIG. 1.

The peripheral device 120, which is schematically illustrated in FIG. 3 according to various embodiments of the present disclosure, may provide any number of functions. For example, the peripheral device may act as a smart card reader to assist in authenticating e-mail sent by the mobile device 110. The illustration of FIG. 3 shows only those components expected to be common to the wide variety of potential peripheral devices. That is, the peripheral device 120 is expected to, at minimum, have a microprocessor 328 and a short-range communication subsystem 304. Additionally, the peripheral device 120 may comprise flash memory 316 and RAM 318, each in communication with the microprocessor 328. The flash memory 316 may, for instance, store a predetermined set of software applications that control operations of the peripheral device 120. Among the predetermined set of software applications may be a power management module.

The peripheral device 120 may optionally comprise a real time clock 305. In accordance with some embodiments, the peripheral device 120 does not have a real time clock 305; that is, the peripheral device 120 is not able to determine the current time, but the peripheral device 120 is able to determine a relative time.

In overview, the mobile device 110 transmits a power management message to the peripheral device 120. The power management message indicates to the peripheral device 120 when to shut off and when to turn on again.

In operation, the mobile device 110 is typically configured by a user of the mobile device 110. In particular, the user employs a user interface to specify that automatic shut-off is to take place and, more particularly, to specify a mobile device shut-off start time and a mobile device shut-off end time. Accordingly, the mobile device 110 receives (step 402, see FIG. 4) an indication of the shut-off period. In accordance with one embodiment, the mobile device shut-off start time and the mobile device shut-off end time may be specified in terms of a 12-hour clock. That is, the mobile device shut-off start time may, for example, be specified as 11:00 PM and the mobile device shut-off end time may, for example, be specified as 6:00 AM. While the user may specify the automatic shut-off period in times relative to a 12-hour clock, the peripheral device 120 may not have a need for a 12-hour clock and may only be able to measure the passage of time absolutely. As such, the mobile device 110 may determine (step 404) the duration of the automatic shut-off period by converting the relative times to an absolute duration value. In the exemplary case described above, the automatic shut-off period lasts seven hours, which absolute duration value may also be expressed as minutes, seconds, milliseconds, or other unit of time.

Figure 4:
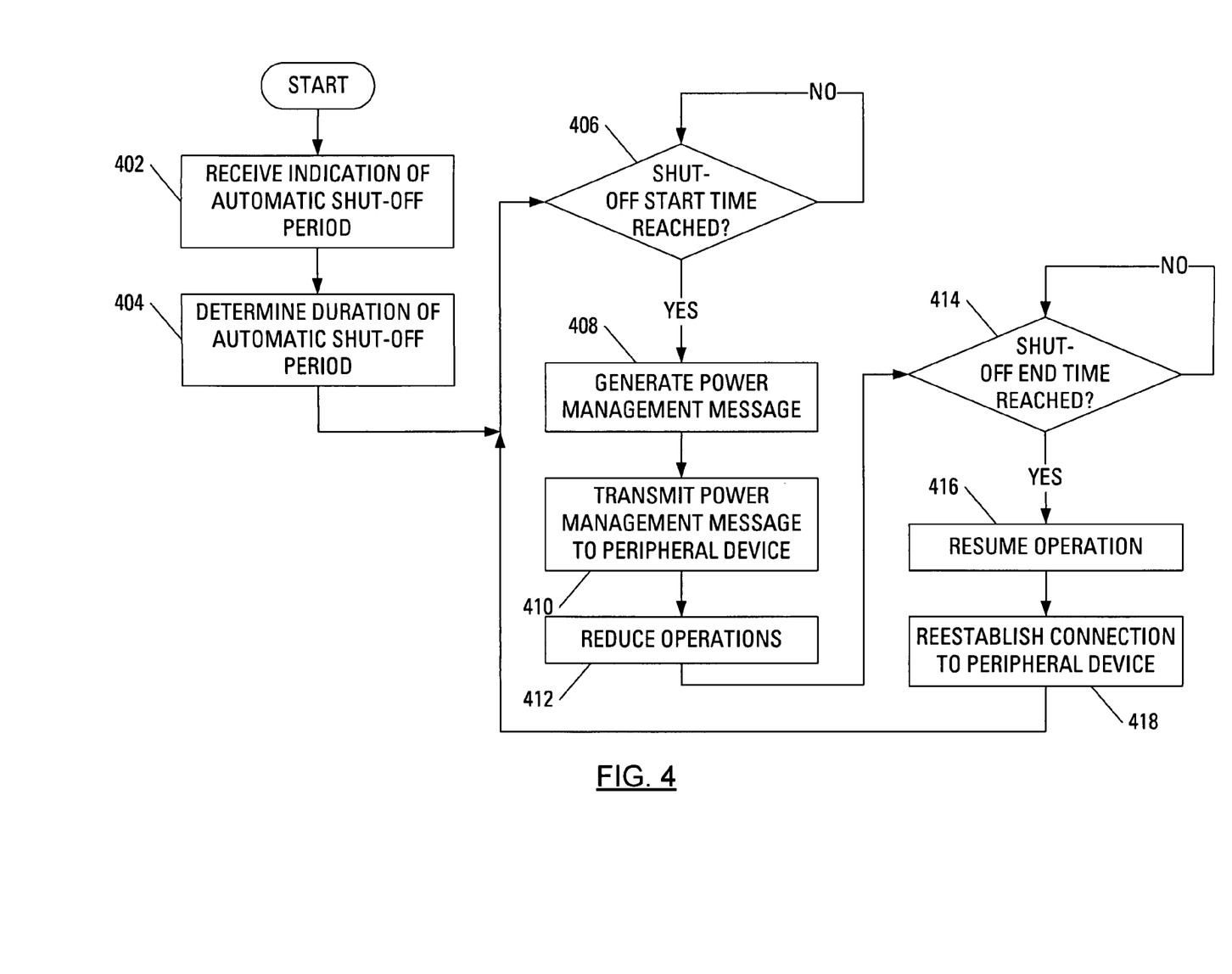
FIG. 4 illustrates steps in an exemplary method of managing, at the base device, power at the peripheral device, according to an embodiment of the application.

With the automatic shut-off period specified and the absolute duration value determined, the power management module 230C executed by the mobile device microprocessor 228 may enter into a loop of waiting until the mobile device shut-off start time is reached. Such a loop is represented in FIG. 4 as the step of determining (step 406) whether the automatic shut-off start time has been reached. If it is determined that the mobile device shut-off start time has not been reached, the determining step (step 406) is repeated.

If it is determined (step 406) that the mobile device shut-off start time has been reached, the mobile device microprocessor 228, executing the power management module 230C, generates (step 408) a power management message. As part of such generating, the mobile device microprocessor 228 inserts the absolute duration value, as determined in step 404, into the power management message. The mobile device microprocessor 228 then transmits (step 410) the power management message to the peripheral device 120. The mobile device microprocessor 228 may then commence to reduce operations (step 412) as would normally occur upon determining that the mobile device shut-off start time has been reached. Such a reduction of operations includes terminating a previously-established connection to the peripheral device 120.

As will be clear to a person of ordinary skill in the art, the transmission (step 410) of the power management message to the peripheral device 120 does not happen instantaneously.

Portions of the power management message may spend some time in a transmission queue (not shown) in the short-range communications subsystem 204 before being transmitted to the peripheral device 120. Typically, the transmission queue in the short-range communications subsystem 204 is cleared, i.e., the entirety of the power management message is transmitted, before commencing to reduce operations (step 412). This can be established by a suitable predetermined wait time between transmitting (step 410) the power management message to the peripheral device 120 and commencing to reduce operations (step 412). Alternatively, the mobile device microprocessor 228 may communicate with the short-range communications subsystem 204 to determine the state of the transmission queue.

Once the reduction of operations (step 412) has been accomplished, the power management module 230C executed by the mobile device microprocessor 228 may enter into a loop of waiting until the mobile device shut-off end time is reached. Such a loop is represented in FIG. 4 as the step of determining (step 414) whether the mobile device shut-off end time has been reached. If it is determined that the mobile device shut-off end time has not been reached, the determining step (step 414) is repeated.

Figure 5:
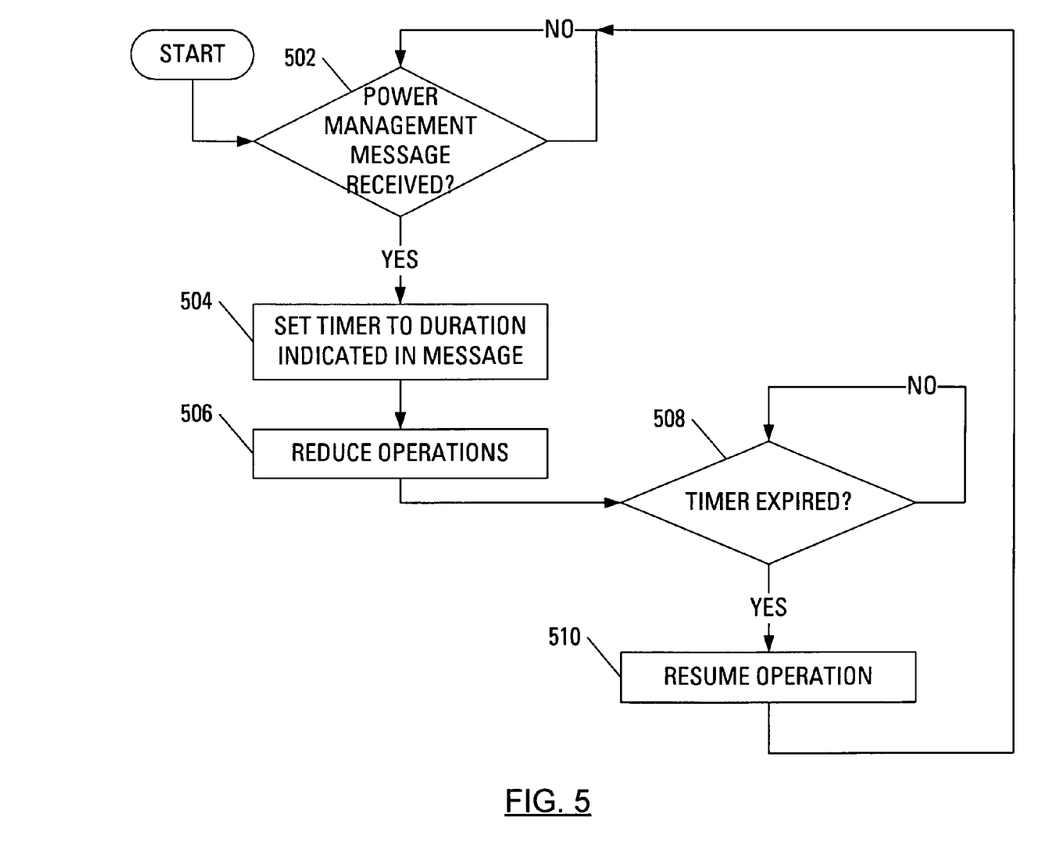
FIG. 5 illustrates steps in an exemplary method of managing power at the peripheral device, in response to the method of FIG. 4, according to an embodiment of the application.

FIG. 5 illustrates steps of an exemplary method of power management for execution by the peripheral device microprocessor 328, in response to the method of FIG. 4. The peripheral device microprocessor 328 initially determines (step 502) whether a power management message, i.e., the power management message transmitted to the peripheral device 120 by the mobile device 110 in step 410 of the method of FIG. 4, has been received. Where a power management message has not been received, the determining (step 502) continues. Where the power management message has been received, the peripheral device microprocessor 328 initializes (step 504) a timer with a value based on the absolute duration value indicated in the received power management message. The peripheral device microprocessor 328 may then commence to reduce operations (step 506). Such a reduction of operations may include terminating a previously-established connection to the mobile device 110 and removing power from the short-range communication subsystem 304.

The peripheral device microprocessor 328 may then enter into a loop of waiting until the timer has expired. Such a loop is represented in FIG. 5 as the step of determining (step 508) whether the timer has expired. If it is determined that the timer has not expired, the determining step (step 508) is repeated. If it is determined (step 508) that the timer has expired, the peripheral device microprocessor 328 commences to resume operations (step 510). Such a resumption of operations (step 510) may include, for instance, restoring power to the short-range communication subsystem 304. The subsequent step in the exemplary power management method of FIG. 5 is a return to determining (step 502) whether a power management message has been received. As long as a power management message has not been received, the determining (step 502) continues.

If the mobile device microprocessor 228, executing the power management module 230C, determines (step 414, FIG. 4) that the mobile device shut-off end time has been reached, the mobile device microprocessor 228 commences to resume operations (step 416) of the mobile device 110. Furthermore, the mobile device microprocessor 228 reestablishes (step 418) the connection to the peripheral device 120.

When devices that use Bluetooth to communicate attempt to establish a connection for the first time, generally, the devices are referred to as paired. That is, they discover details about each other and, in some cases, exchange passwords to indicate that the users in possession of the devices authorize the devices to communicate. Once two devices have been paired, they may establish a communication channel. Furthermore, a first device may be arranged to automatically re-establish a Bluetooth communication channel with second device upon recognizing proximity and availability of the second device. It is anticipated that both the mobile device 110 and the peripheral device 120 will exhibit a delay between the time at which the devices commence to resume operations (steps 416, 510) and the time at which the devices are fully functional. As such, when determining the absolute duration value in step 404, the mobile device 110 may reduce the absolute duration value so that the peripheral device microprocessor 328 will resume operations (step 510) and be fully functional before the mobile device 110 is fully functional. At the time of full functionality, the mobile device 110 may then recognize the presence of the peripheral device 120 and initiate re-establishment of a connection to the peripheral device 120.

When traffic between the mobile device 110 and the peripheral device 120 is to be secure, the mobile device 110 and the peripheral device 120 may exchange cryptographic keys for use in encrypting the traffic. In accordance with various embodiments, the key exchange may be an Encrypted Key Exchange. One suitable Encrypted Key Exchange is the Simple Password Exponential Key Exchange (SPEKE) protocol. As it may be considered that the security of encrypted traffic reduces with the age of the cryptographic keys, timers are typically associated with the keys. The timers may, for instance, be related to the activity of a connection or the longevity of a connection and may be established according to policies that govern the mobile devices of a particular enterprise or may be established according to individual user settings. An inactivity timer may be initialized each time traffic is passed over the connection between the mobile device 110 and the peripheral device 120. The inactivity timer would then count down. When the inactivity timer reaches zero without being re-initialized, the mobile device 110 and the peripheral device 120 agree upon a new set of cryptographic keys. A longevity timer, for instance, may be initialized upon the establishment of an agreed set of keys. The longevity timer would then count down. When the longevity timer reaches zero, the mobile device 110 and the peripheral device 120 agree upon a new set of cryptographic keys.

In accordance with various embodiments of the present application, the timers may only be active during regular operation. That is, when the mobile device 110 instructs the peripheral device 120 to enter into a period of reduced operation, before entering into a period of reduced operation itself, the mobile device 110 may suspend one or more of the timers related to the cryptographic keys. Similarly, prior to entering into a period of reduced operation according to timing received in a message from the mobile device 110, the peripheral device 120 may also suspend one or more of the timers related to the cryptographic keys. When a given timer is suspended, the given timer will not expire while the mobile device 110 and the peripheral device 120 are in respective periods of reduced operation.

In other embodiments, however, the timers related to the cryptographic keys are not suspended during the period of reduced operation. Rather, the timers continue to run during the period of reduced operation and are susceptible to expiring. Some types of timers related to the cryptographic keys fire when there is a lack of connection between the two devices, or lack of activity, for a predetermined duration. Where the predetermined duration is longer that a given period of reduced operation, under circumstances described hereinbefore, at the end of the given period of reduced operation, both the mobile device 110 and the peripheral device 120 resume operation and reestablish their connection the timer stops. If for some reason, the connection fails to reestablish, the timer fires the predetermined duration after the beginning of the given period of reduced operation.

In accordance with various other embodiments of the present disclosure, instead of using relative time, absolute time may be used. In such embodiments, the peripheral device 120, or the peripheral device microprocessor 328, comprises real time clock 305; that is, that the peripheral device 120 is able to determine the current time. The availability of the real time clock 305 to the peripheral device 120 eliminates the requirement of the mobile device microprocessor 228 to determine (step 404, FIG. 4) the duration of the automatic shut-off period.

Figure 6:
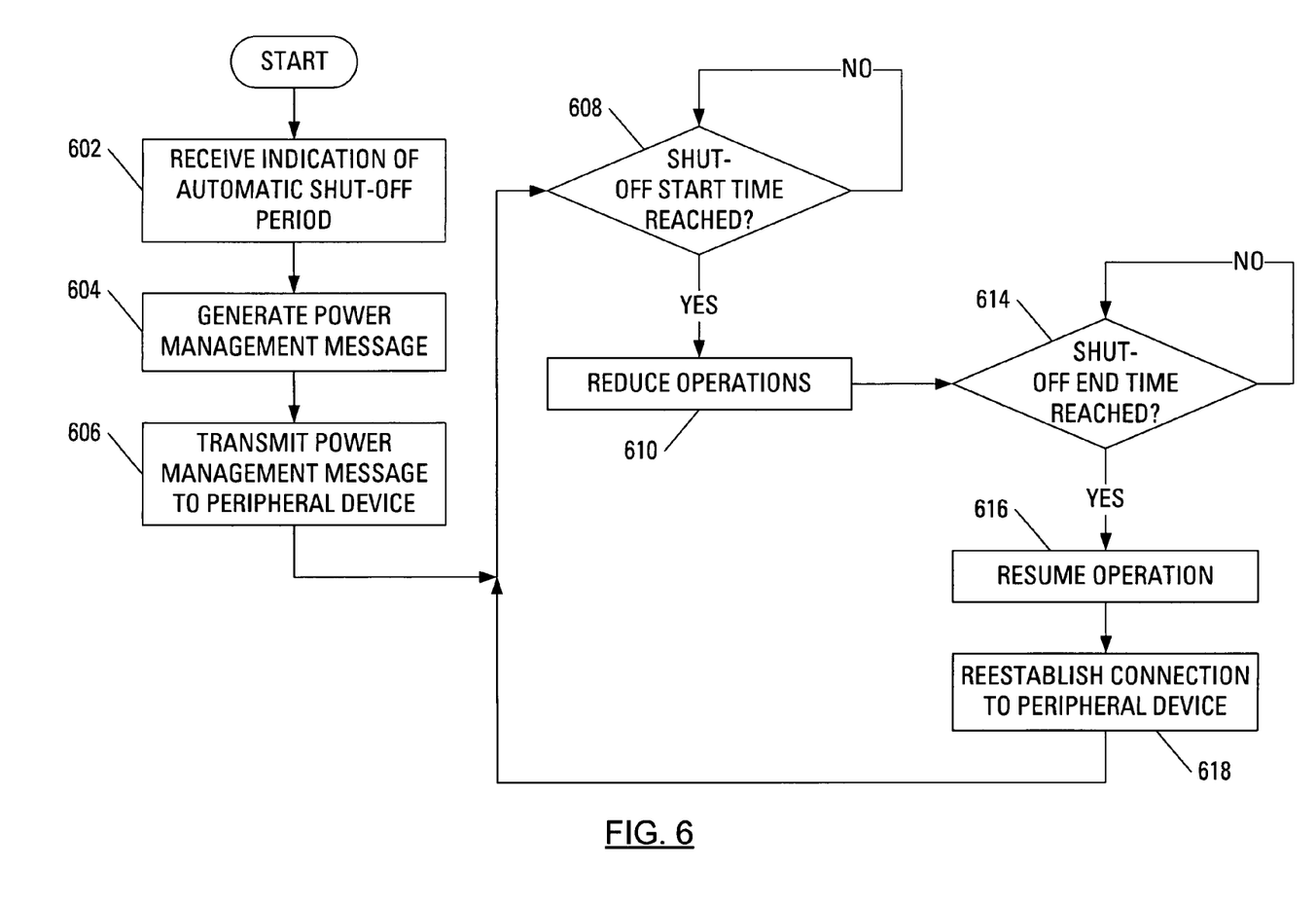
FIG. 6 illustrates steps in an exemplary method of managing, at the base device, power at the peripheral device, according to an embodiment of the application.

FIG. 6 illustrates exemplary operation of the mobile device 110 when the real time clock 305 is available to the peripheral device 120. The mobile device 110 receives a specification, for example, by user interface, that automatic shut-off is to take place and, more particularly, specification of a mobile device shut-off start time and a mobile device shut-off end time. That is, the mobile device 110 receives (step 602) an indication of the bounds of the shut-off period.

The mobile device microprocessor 228, executing the power management module 230C, generates (step 604) a power management message. As part of such generating, the mobile device microprocessor 228 inserts a peripheral device shut-off start time and a peripheral device shut-off end time into the power management message. The mobile device microprocessor 228 then transmits (step 606) the power management message to the peripheral device 120.

The power management module 230C executed by the mobile device microprocessor 228 enters into a loop of waiting until the mobile device shut-off start time is reached. Such a loop is represented in FIG. 6 as step of determining (step 608) whether the mobile device shut-off start time has been reached. If it is determined that the mobile device shut-off start time has not been reached, the determining step (step 608) is repeated.

If it is determined (step 608) that the mobile device shut-off start time has been reached, the mobile device microprocessor 228 then commences to reduce operations (step 610). Such a reduction of operations includes terminating a previously-established connection to the peripheral device 120.

Once the reduction of operations (step 610) has been accomplished, the power management module 230C executed by the mobile device microprocessor 228 may enter into a loop of waiting until the mobile device shut-off end time is reached. Such a loop is represented in FIG. 6 as the step of determining (step 614) whether the mobile device shut-off end time has been reached. If it is determined that the mobile device shut-off end time has not been reached, the determining step (step 614) is repeated.

Figure 7:
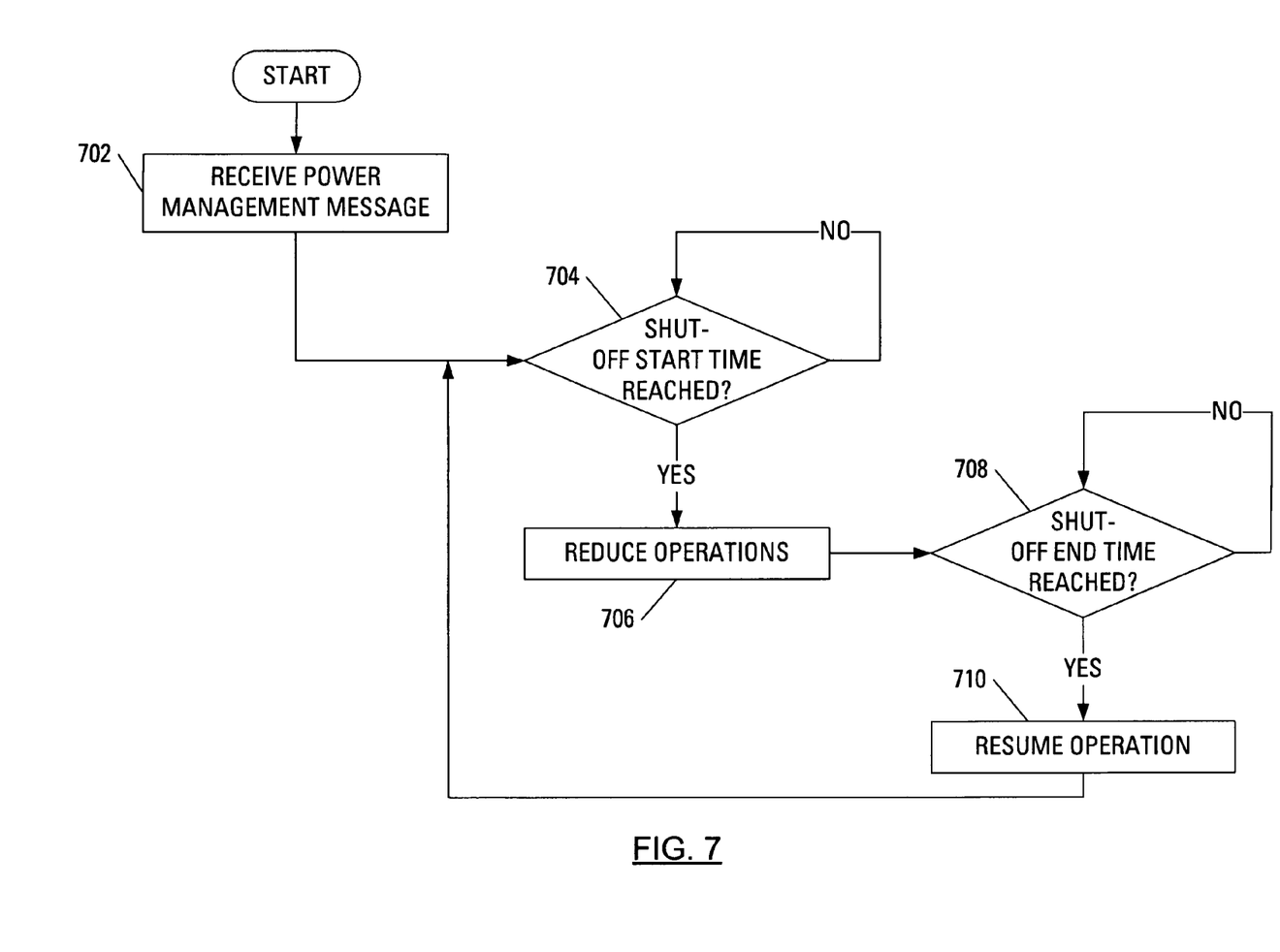
FIG. 7 illustrates steps in an exemplary method of managing power at the peripheral device, in response to the method of FIG. 6, according to an embodiment of the application.

FIG. 7 illustrates steps of an exemplary method of power management for execution by the peripheral device microprocessor 328 when the real time clock 305 is available to the peripheral device 120 and in response to the method of FIG. 6. The peripheral device microprocessor 328 initially receives (step 702) a power management message, i.e., the power management message transmitted to the peripheral device 120 by the mobile device 110 in step 606 of the method of FIG. 6.

The power management message allows the peripheral device 120 to establish a peripheral device shut-off start time and a peripheral device shut-off end time. The peripheral device microprocessor 328 may then enter into a loop of waiting until the peripheral device shut-off start time has been reached. Such a loop is represented in FIG. 7 as the step of determining (step 704) whether the peripheral device shut-off start time has been reached. If it is determined that the peripheral device shut-off start time has not been reached, the determining step (step 704) is repeated. If it is determined (step 704) that the peripheral device shut-off start time has been reached, the peripheral device microprocessor 328 commences to reduce operations (step 706). Such a reduction of operations includes terminating a previously-established connection to the mobile device 110.

The peripheral device microprocessor 328 may then enter into a loop of waiting until the peripheral device shut-off end time has been reached. Such a loop is represented in FIG. 7 as the step of determining (step 708) whether the peripheral device shut-off end time has been reached. If it is determined that the peripheral device shut-off end time has not been reached, the determining step (step 708) is repeated. If it is determined (step 708) that the peripheral device shut-off end time has been reached, the peripheral device microprocessor 328 commences to resume operations (step 710). The subsequent step in the exemplary power management method of FIG. 7 is a return to determining (step 704) whether the peripheral device shut-off start time has been reached. As long as the peripheral device shut-off start time has not been reached, the determining (step 704) continues.

If the mobile device microprocessor 228, executing the power management module 230C, determines (step 614, FIG. 6) that the mobile device shut-off end time has been reached, the mobile device microprocessor 228 commences to resume operations (step 616) of the mobile device 110. Furthermore, the mobile device microprocessor 228 reestablishes (step 618) the connection to the peripheral device 120.

In one embodiment, the mobile device shut-off start time and the peripheral device shut-off start time are equivalent. Similarly, the mobile device shut-off end time and the peripheral device shut-off end time are also equivalent. That is, the shut-off times for the two devices are synchronized. However, as discussed above, it may be advantageous to have the peripheral device 120 resume operations (step 710) before the mobile device 110 resumes operations (step 616). In such a case, the peripheral device shut-off end time may be adjusted to allow for an earlier resumption of operations.

In comparing FIG. 4 to FIG. 6, one can note the differences brought about by the use of the real time clock 305 in the peripheral device 120. In particular, in the absence of the real time clock 305, the mobile device 110 may send a power management message to the peripheral device 120 each time the peripheral device 120 is to reduce operations. In contrast, in the presence of the real time clock 305, the mobile device 110 may only send one power management message to the peripheral device 120, where the one power management message defines shut-off start and end times to be followed continually by the peripheral device 120.

Accordingly, there is a slight reduction in traffic over the communication channel between the mobile device 110 and the peripheral device 120 when the peripheral device 120 has a real time clock.

Notably, the two scenarios, i.e., with and without real time clock, have in common that the structure of the power management message includes an indication of bounds of a period of reduced operation for the peripheral device 120.

In the case where the peripheral device 120 has access to a real time clock, the "bounds" are defined as the peripheral device shut-off start time and the peripheral device shut-off end time. In the case where the peripheral device 120 does not have access to a real time clock, the "bounds" are defined as "now" for the peripheral device shut-off start time and "an absolute duration value away from now" as the peripheral device shut-off end time.

While the description above has provided an exemplary situation of a mobile communication device 110 controlling a Bluetooth-connected peripheral device 120, a person of ordinary skill in the art will recognize that the base device need not be a mobile communication device and could, for instance, be a traditional personal computer, e.g., a desktop or notebook computer. Additionally, the communications channel between the base device and the peripheral device need not be Bluetooth or even, for that matter, wireless. For example, according to aspects of this application, a notebook computer with a pre-designated shut-off period may communicate with a printer over a wired connection to instruct the printer to shut off while the notebook computer is also shut off.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. At a base device, a method of managing power of a peripheral device, said method comprising:
   receiving an indication of bounds of a period of reduced operation for said base device;
   generating a power management message, said power management message including an indication of bounds of a period of reduced operation for said peripheral device; and
   transmitting said power management message to said peripheral device.

2. At a base device, a method of managing power of a peripheral device, said method comprising:
   receiving an indication of bounds of a period of reduced operation for said base device;
   generating a power management message, said power management message including an indication of bounds of a period of reduced operation for said peripheral device; and
   transmitting said power management message to said peripheral device;
   wherein said indication of bounds of said period of reduced operation for said base device includes a mobile device reduced operation start time and a mobile device reduced operation end time;
   wherein said method further comprises:
      determining a peripheral device reduced operation duration value based on said mobile device reduced operation start time and said mobile device reduced operation end time; and
   wherein said bounds of said period of reduced operation for said peripheral device comprise:
      a time of receipt of said power management message; and
      said reduced operation duration value later than said time of receipt of said power management message.

3. The method of claim 2 further comprising delaying said transmitting until a time proximate to said mobile device reduced operation start time.

4. At a base device, a method of managing power of a peripheral device, said method comprising:
   receiving an indication of bounds of a period of reduced operation for said base device;
   generating a power management message, said power management message including an indication of bounds of a period of reduced operation for said peripheral device; and
   transmitting said power management message to said peripheral device;
   wherein said indication of bounds of said period of reduced operation for said base device includes a mobile device reduced operation start time and a mobile device reduced operation end time;
   wherein said method further comprises:
      determining a peripheral device reduced operation start time based on said mobile device reduced operation start time; and
      determining a peripheral device reduced operation end time based on said mobile device reduced operation end time; and
   wherein said bounds of said period of reduced operation for said peripheral device comprise:
      said peripheral device reduced operation start time; and
      said peripheral device reduced operation end time.

5. The method of claim 1 further comprising:
   establishing a wireless communication channel with said peripheral device prior to said transmitting.

6. The method of claim 5 wherein said wireless communication channel comprises a Bluetooth™ communication channel.

7. The method of claim 5 wherein implementing said reduced operation for said base device comprises terminating maintenance of said wireless communication channel.

8. The method of claim 5 wherein entering said reduced operation for said peripheral device comprises terminating maintenance of said wireless communication channel with said base device.

9. At a base device, a method of managing power of a peripheral device, said method comprising:
   receiving an indication of bounds of a period of reduced operation for said base device;
   generating a power management message, said power management message including an indication of bounds of a period of reduced operation for said peripheral device; and
   transmitting said power management message to said peripheral device;
   wherein said indication of bounds of said period of reduced operation for said base device includes a mobile device reduced operation start time and a mobile device reduced operation end time; and
   wherein said method further comprises:
      determining whether said mobile device reduced operation start time has been reached; and
      responsive to determining that said mobile device reduced operation start time has been reached, reducing operation of said base device.

10. The method of claim 9 further comprising:
    determining whether said mobile device reduced operation end time has been reached; and
    responsive to determining that said mobile device reduced operation start time has been reached, resuming operation.

11. The method of claim 10 further comprising:
    responsive to said determining that said mobile device reduced operation end time has been reached, reestablishing a previously established communication channel with said peripheral device.

12. The method of claim 9 further comprising:
responsive to said determining that said mobile device reduced operation start time has been reached, suspending a timer related to a cryptographic key in use for secure communication with said peripheral device.

13. The method of claim 9 further comprising:
running a timer related to a cryptographic key in use for secure communication with said peripheral device; and
continuing to run said timer during reduced operation of said base device.

14. The method of claim 1 wherein said base device comprises a mobile communications device.

15. The method of claim 1 wherein said peripheral device comprises a smart card reader.

16. A base device comprising:
a processor adapted to:
receive an indication of bounds of a period of reduced operation for said base device; and
generate a power management message, said power management message including an indication of bounds of a period of reduced operation for said peripheral device; and
a transmitter for transmitting said power management message to a peripheral device.

17. The base device of claim 16 further comprising a real time clock communicatively connected to said processor.

18. The base device of claim 16 wherein said base device comprises a mobile communications device.

19. A computer readable medium containing computer-executable instructions that, when performed by processor in a base device, cause said processor to:
receiving an indication of bounds of a period of reduced operation for said base device;
generating a power management message, said power management message including an indication of bounds of a period of reduced operation for said peripheral device; and
transmitting said power management message to said peripheral device.

* * * * *